(No Model.)
S. SHAW.
APPARATUS FOR MELTING IRON OR IRON ORE.
No. 504,308. Patented Aug. 29, 1893.
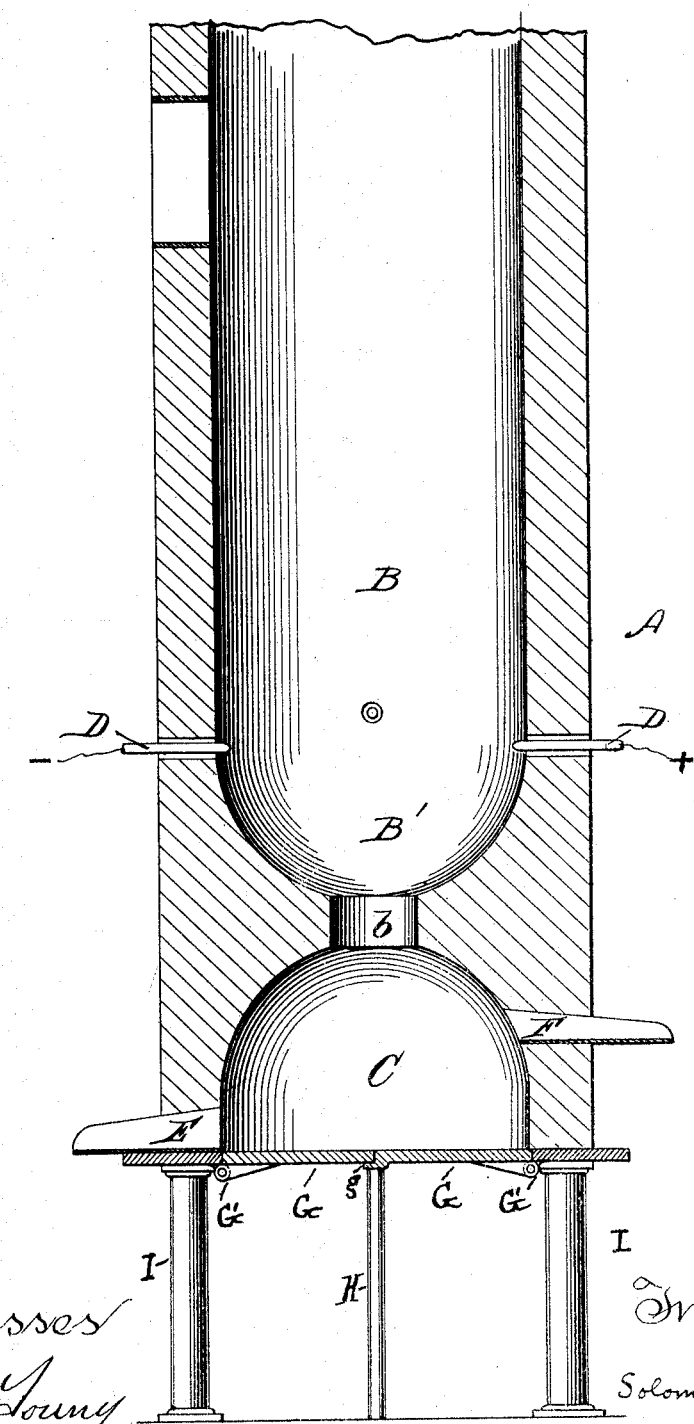

UNITED STATES PATENT OFFICE.

SOLOMON SHAW, OF MILWAUKEE, WISCONSIN, ASSIGNOR OF ONE-FOURTH TO THE EDWARD P. ALLIS COMPANY, OF SAME PLACE.

APPARATUS FOR MELTING IRON OR IRON ORE.

SPECIFICATION forming part of Letters Patent No. 504,308, dated August 29, 1893.

Application filed November 14, 1891. Serial No. 411,859. (No model.)

*To all whom it may concern:*

Be it known that I, SOLOMON SHAW, a citizen of the United States, and a resident of Milwaukee, in the county of Milwaukee, and in the State of Wisconsin, have invented certain new and useful Improvements in Apparatus for Melting Iron or Iron Ore; and I do hereby declare that the following is a full, clear, and exact description thereof.

My invention has for its object the melting of iron whether in the form of pig iron, scrap iron, iron ore or any other form, by means of electricity and it consists in apparatus substantially such as hereinafter described and claimed.

The drawing represents a vertical section of a cupola furnace provided with electrodes arranged to produced a voltaic arc when energized by a current of electricity.

My present invention, in all its essential features is practically the same as that set forth in my application, Serial No. 403,512, filed August 24, 1891, but in practice, I have found that the shape and arrangement of my present furnace, as illustrated in the drawing of my present application, is more advantageous for the melting of iron ore, and small or broken pieces of iron, than the form and arrangement shown in my said prior application.

In the accompanying drawing: A represents a cupola furnace provided in its upper portion with the usual receptacle B for the material to be melted. I prefer to make the lower part of this receptacle B, of a rounded concave form as illustrated at B', so as to afford a support for the mass of metal or ore contained in the receptacle B, and in the bottom of said rounded concave portion, I provide a passage $b$ leading into the chamber C arranged to receive the material discharged from the receptacle B in the usual manner.

At the bottom or floor of the chamber C, I provide two traps G, hinged at G', and arranged to overlap each other at the center, forming a fluid-tight joint at $g$, and supported by the removable post or support H, and when it is desirable to clean the chamber C, the support H, is withdrawn which permits the traps G, to swing down on their hinges and affords access to the chamber C.

I, I, represent pillars or supports upon which the whole structure is mounted.

In melting iron ore, and small scrap iron more or less dross arises to the top of the molten metal, and for the purpose of separating this dross from the clean metal, I arrange the tap hole E in the lower part of the chamber C, and at a point in the upper part of said chamber C, I arrange a second opening F for the discharge of the dross which rises to the top of the metal.

In my present form of construction, I locate electrodes D D, connected with any desired source of electricity, in such a position as to produce a voltaic arc within the lower portion of the receptacle B, instead of in the passage between the said receptacle and the chamber C in the lower part of the furnace, as in the forms of construction illustrated in my former application, and to accomplish the desired result in the most satisfactory manner with my present form of furnace, it is desirable that the inner walls of the receptacle B, should be practically vertical, and necessary that the electrodes D, D, should be introduced at that point in the lower part of said receptacle where the vertical wall portion ends, and just above the rounded concave portion B', so that the voltaic arc may be formed exactly at the initial point of contraction. By this construction, the mass of material in the receptacle B, is retarded in its downward movement and supported within the lower portion of the said receptacle for a sufficient time to enable the material to be melted by means of the voltaic arc established between the inner ends of the electrodes D D, and thence said material escapes in a molten condition into the chamber C, through the contracted passage $b$.

By my improvement, I am enabled to more satisfactorily melt iron ore, scrap, or refuse iron, than if the said material were permitted to descend rapidly through the receptacle B and without being retarded at the lower end thereof. By my improvement, also, I am enabled to melt iron ore, without the use of a flux, the ore being simply passed between the poles of a voltaic arc and acted on directly by the current of electricity. As the material in the lower portion of the receptacle becomes melted, it escapes into the lower chamber C, and the material contained in the upper part of said receptacle gradually descends and is acted on by the arc.

By my improvements, a much cleaner product is obtained than where a flux is used to melt the metal. It will of course, be understood that any suitable form of adjusting mechanism may be employed for the purpose of feeding the electrodes toward each other, in order to maintain a constant arc. This mechanism may of course comprise devices substantially of the same construction and arrangement as the adjusting devices illustrated in my previously mentioned, prior application, or any other desired form of device may be employed for this purpose.

Having thus described my invention, what I claim as new, and desire to secure by Letters Patent of the United States, is—

1. An improved cupola furnace provided with a receptacle for metal or metallic ores in its upper portion, said receptacle having vertical walls and a rounded concave lower end, a chamber below said receptacle provided with discharge openings at different elevations, and a contracted passage leading from the said receptacle to the said chamber, and occupying the central vertical axial line of both of said parts, in combination with electrodes located in the lower part of said receptacle at the lower end of the vertical wall portion and above the rounded concave portion thereof, substantially as set forth.

2. An improved cupola furnace comprising vertical walls and a rounded concave base, and having electrodes introduced near its bottom, a narrowed passage connecting with a receiving chamber below, the said chamber provided with a slag opening and a tap-hole arranged at different elevations, and having hinged traps at the bottom, all arranged substantially as described.

3. A cupola furnace provided in its upper portion with a receptacle for metal or metallic ores having an inwardly contracted base and vertical sides, electrodes arranged within the lower portion of the said receptacle at the initial point of contraction, a narrowed passage connecting the receptacle with the receiving chamber, a receiving chamber, below said passage, provided with a slag opening and a tap-hole arranged at different elevations, and having its bottom formed of two fluid-tight hinged doors or traps, and a removable support for said traps, all combined, arranged and operating substantially as described.

In testimony that I claim the foregoing I have hereunto set my hand, at Milwaukee, in the county of Milwaukee and State of Wisconsin, in the presence of two witnesses.

SOLOMON SHAW.

Witnesses:
H. G. UNDERWOOD,
M. S. UNDERWOOD.